United States Patent [19]

Ballheimer et al.

[11] E Patent Number: Re. 33,575

[45] Reissued Date of Patent: Apr. 23, 1991

[54] INTERNAL COMBUSTION ENGINE NOISE REDUCTION PLATE

[75] Inventors: Benny Ballheimer; Michael K. Stratton, both of Peoria, Ill.

[73] Assignee: Caterpillar Inc., Peoria, Ill.

[21] Appl. No.: 516,885

[22] Filed: Apr. 30, 1990

Related U.S. Patent Documents

Reissue of:

[64] Patent No.: 4,771,747
Issued: Sep. 20, 1988
Appl. No.: 134,421
Filed: Dec. 17, 1987

[51] Int. Cl.[5] ..... F02B 77/00; F02F 7/08

[52] U.S. Cl. ..... 123/198 E; 123/195 H

[58] Field of Search ..... 123/198 E, 195 H, 195 C; 92/73; 181/204; 384/432, 429, 433, 434

[56] References Cited

U.S. PATENT DOCUMENTS

| | | | |
|---|---|---|---|
| 3,841,203 | 10/1974 | Bruce | 92/73 |
| 4,219,002 | 8/1980 | Danckert et al. | 123/198 E |
| 4,377,993 | 3/1983 | List | 123/198 E |
| 4,445,472 | 5/1984 | Ogawa et al. | 123/198 E |
| 4,453,509 | 6/1984 | Hayashi | 123/198 E |
| 4,467,755 | 8/1984 | Hayashi | 123/195 H |
| 4,497,292 | 2/1985 | Hayashi et al. | 123/198 E |
| 4,515,119 | 5/1985 | Hayashi et al. | 123/198 E |
| 4,522,165 | 6/1985 | Ogawa | 123/198 E |
| 4,729,351 | 3/1988 | Nishimura et al. | 123/198 E |

FOREIGN PATENT DOCUMENTS

| | | | |
|---|---|---|---|
| 60-95164 | 5/1985 | Japan | 123/198 E |
| 2164389A | 3/1986 | United Kingdom . | |

OTHER PUBLICATIONS

SAE Paper 690450 by T. Priede, E. C. Grover and N. Lalor, entitled "Relation Between Noise and Basic Structural Vibration of Diesel Engines" presented May 19–23, 1969, in Chicago, Ill.

*Primary Examiner*—Raymond A. Nelli
*Attorney, Agent, or Firm*—Larry G. Cain

[57] ABSTRACT

Rigidifying or structural members are used to increase structural stiffness of cylinder block and consequently have reduced vibrations and noise emitted therefrom. These devices in the past have reduced serviceability, increased engine component complexity, increased cost and allowed additional interfaces for lubricant to leak therefrom. The subject structural member or rigidifying member provides a simple, inexpensive, light-weight solution to increasing structural stiffness of cylinder block. The subject structural member has an uninterrupted flange therearound and a plurality of equally spaced longitudinally positioned openings therethrough. The flange is secured in frictional contact with the inner mounting surface inside the oil pan. Thus, the interface for lubrication leakage of past members has been eliminated. The openings have reduced the weight of the member and provide an opening through which the crankshaft can swing preventing the need to increase the engine height. The structural member is free of connection with the main bearing caps which reduces component complexibility, cost and simplifies serviceability.

20 Claims, 3 Drawing Sheets

INTERNAL COMBUSTION ENGINE NOISE REDUCTION PLATE

Matter enclosed in heavy brackets [ ] appears in the original patent but forms no part of this reissue specification; matter printed in italics indicates the additions made by reissue.

TECHNICAL FIELD

This invention relates generally to internal combustion engines and more particularly to a device for reducing noise emission by increasing the rigidity of the block with a stiffener plate.

BACKGROUND ART

In general, it is common knowledge that by increasing overall rigidity of large planar sections of an engine or compressor block, the noise emitted therefrom can be reduced. However, excess material increases weight and reduces the weight to horsepower ratio for highway applications. Furthermore, excess material increases component costs. One concept to increase rigidity is discussed in a paper by Priede, Grover and Lalor, published in The Society of Automotive Engineers Journal, Paper No. 450, 1969. The paper suggests the use of a crank frame and crank beam structure to reduce engine block deformation which consequently causes a reduction in noise. A major problem of such a structure as disclosed in the paper is that a radical engine redesign is required. Such a design would require a total revision of the existing engine concept. Therefore, use of such a concept is unrealistic for adapting to an existing engine design.

U.S. Pat. No. 3,842,203 to Glenister Bruce issued Oct. 15, 1974 discloses a rigid beam bolted to the bearing caps and the block sidewalls of an engine or compressor to improve crankshaft and crankcase stiffness. The beam is attached to the main bearing caps by an outer retaining bolt after the caps have been assembled and secured to the crankcase by two inner retaining bolts. The stiffening beam is shown attached to a vertical inner side of the block and secured by a bolt. The beam is also shown abutted against the flat horizontal lower face of the block skirt. Furthermore, the beam is always secured to the bearing caps. The securing of the beam to the bearing caps adds an unnecessary limitation to the structure which is not required when adding rigidity to most existing engine structures. For example, the structure requires additional machining and assembly time, reduces seviceability, and adds cost to the design which in today's competitive world reduces sales and profits.

UK Patent Application GB No. 2 164 389A to Otmar Andres published Mar. 19, 1986 discloses a stiffening frame with cross members below detachable crankshaft bearing caps. The stiffening frame is positioned between the block and the oil pan. This concept requires a gasket between the block and frame and a gasket between the frame and the oil pan. A plurality of bolts extend through the oil pan, gaskets and frame and threadably secures the components together. Positive clamping between the frame and block is prevented by the gasket therebetween. This type of construction provides another joint which will increase the chance of eventual leaks. Aging of the gasket, fretting between associated members and vibrations between the block and gasket further contribute to the potential of such leakage.

The present invention is directed to overcoming one or more of the problems as set forth above.

DISCLOSURE OF THE INVENTION

In one aspect of the present invention, an engine comprises a cylinder block having a pair of elongate, spaced apart sidewalls each defining an outer mounting surface along a lower edge thereof. A crankshaft mounting means is integral with the block and is in elevationally upwardly spaced relation to the outer mounting surface and includes removable bearing caps. The sidewalls further define an inner mounting surface elevationally spaced below the bearing caps. A crankshaft is rotatably mounted in the crankshaft mounting means and retained therein by the bearing caps. An oil pan is sealingly and removably connected to the outer mounting surfaces of the sidewalls. A rigidifying means is removably connected to the inner mounting surface and structurally interconnects the pair of sidewalls and is free of connection with the bearing caps.

The present invention provides a rigidifying or structural member which is a simple, inexpensive, lightweight solution to increasing structural stiffness of a cylinder block. The member is secured in frictional contact with the inner mounting surface inside the oil pan. The member reduces the interface for lubrication leakage since it is positioned within the pan and simplifies seviceability and reduces component complexity since it is free of connection with the main bearing caps.

BEST MODE FOR CARRYING OUT THE INVENTION

Figure 4:
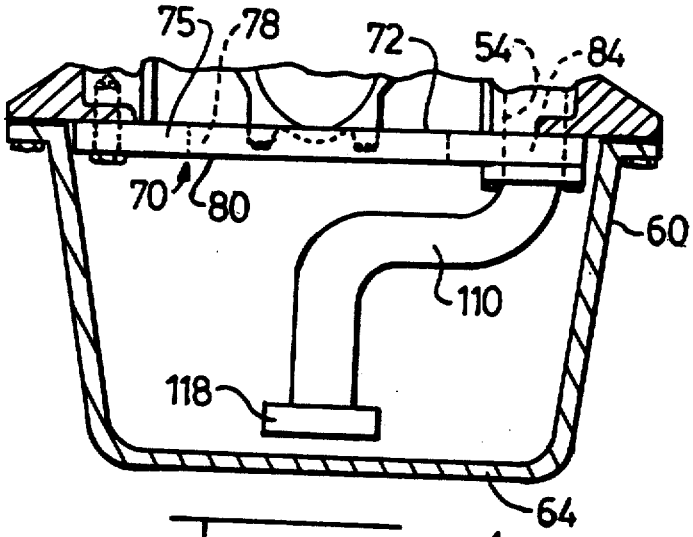
FIG. 4 is a cross-sectional view of another embodiment of the present invention.
Figure 1:
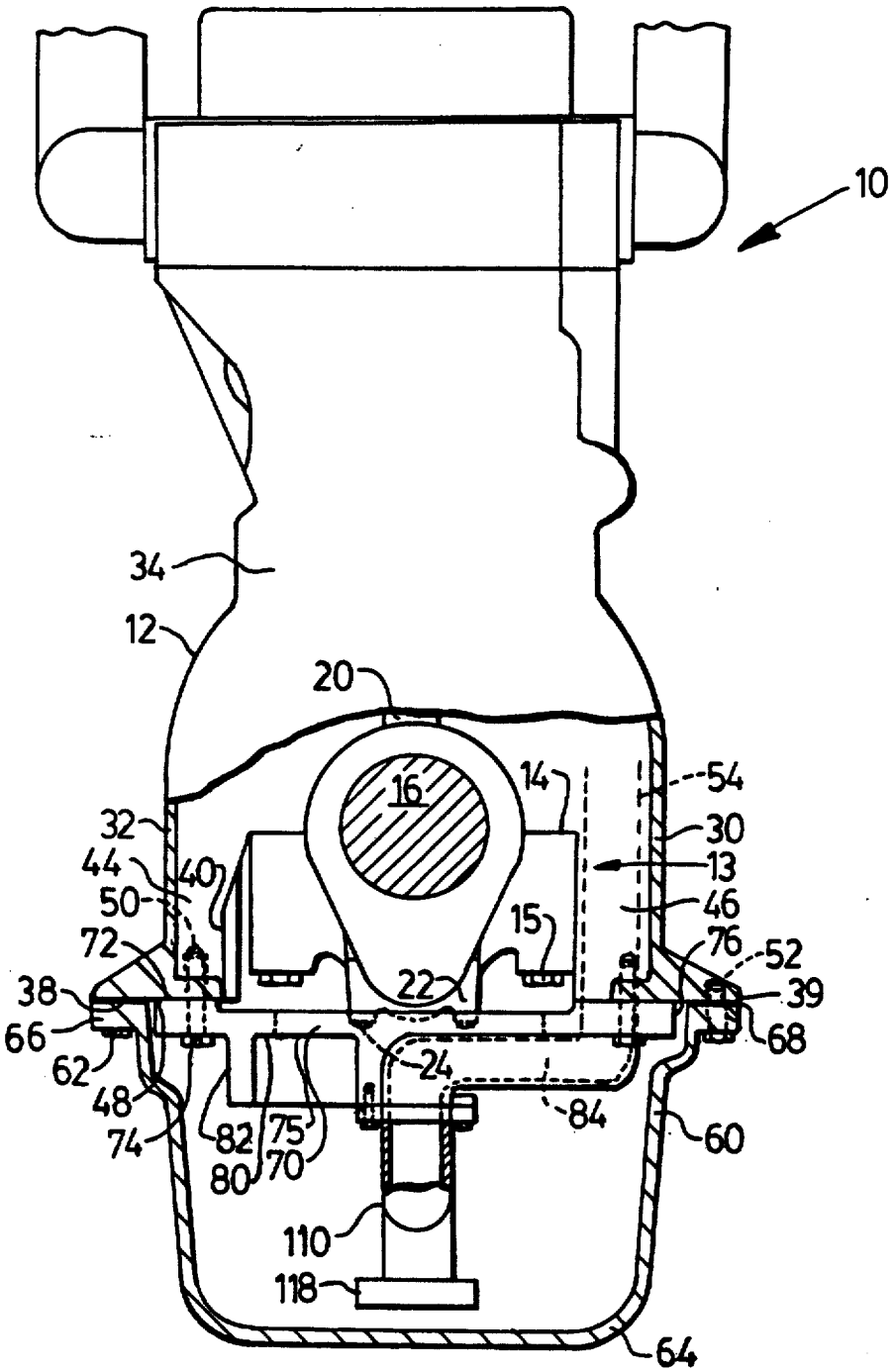
FIG. 1 is an end view of an engine embodying the present invention with portions shown in section for illustration convenience.

Referring to FIGS. 1 and 4, an internal combustion engine 10 includes a cylinder block 12, crankshaft mounting means 13 which includes a plurality of main bearing caps 14 removably attached to the cylinder block 12 by a plurality of bolts 15, a crankshaft 16 rotatably connected to the cylinder block 12 by the plurality of main bearing caps 14, a plurality of piston and connecting rod assembly 20, and a plurality of connecting rod bearing caps 22 removably attached to the plurality of piston and connecting rod assemblies 20 by a plurality of bolts 24.

The cylinder block 12 includes a pair of elongate, spaced apart sidewalls 30,32 which extend below and are elevationally, downwardly spaced from the crankshaft mounting means 13. The block 12 further includes a pair of opposite ends 34,36. An outer mounting surface 38 is defined along a lower edge or bottom 39 of the cylinder block 12 and the sidewalls 30,32. The crankshaft mounting means 13 is integral with the block 12 and is in elevationally, upwardly spaced relation to the outer mounting surface 38. A plurality of longitudinally spaced integral struts 40 bridge between the thin sidewalls 30,32. Each of the struts 40 has a pair of laterally spaced apart legs 44,46 extending downwardly from the crankshaft mounting means 13 toward the lower edge 39 of the cylinder block 12. An inner mounting surface 48 is provided at the bottom of each of the legs 44,46 near the lower edge 39 of the block 12. In the specific embodiment shown, the inner mounting surfaces 48 and the outer mounting surfaces 38 lie on the same horizontal plane but as an alternative could be disposed on different horizontal planes. Each of the legs 44,46 has a threaded hole 50 therein extending upwardly from the inner mounting surface 48. The cylinder block 12 has a plurality of threaded holes 52 therein extending upwardly from the outer mounting surface 38. The cylinder block 12 has a fluid passage 54 therein opening at the inner mounting surface 48.

An oil pan 60 is removably attached to the cylinder block 12 by a plurality of bolts 62 in engagement with the threaded holes 52 in a conventional manner. The oil pan 60 has a lubricant retaining bowl portion 64 near one end and a lip 66 at the upper portion. A gasket 68 is sealingly interposed between the lip 66 and the outer mounting surface of the block 12.

As best shown in FIG. 1, a sound damping or rigidifying means 70 has an inner mounting side 72 and is clamped in frictional engagement with the inner mounting surface 48 by a plurality of bolts 74 in engagement with the threaded holes 50. The sound damping means 70 bridges the space between the thin sidewalls 30,32. The sound damping or rigidifying means 70 of this embodiment includes a structural member 75 constructed of an aluminum casting with an uninterrupted flange 76 therearound and a plurality of equally spaced longitudinally positioned openings 78 therethrough. An oil pan side 80 of the member 75 is provided with a plurality of strengthening ribs 82 extending therefrom. A fluid passage 84 is integrally formed in the structural member 75 and communicates with the opposite sides thereof. The fluid passage 84 at the inner mounting side 72 is in alignment with the fluid passage 54 in the cylinder block 12. The fluid passage 84 is sealed with the fluid passage 54 in any suitable manner.

A lubrication suction tube 110 is removably attached to the structural member 75 in alignment with one of the openings 86,88. The other opening is closed in any suitable manner such as a plate or plug. A strainer 118 is attached to the lower end of the tube and is positioned in close proximity to the bowl portion 64 of the oil pan 60. The structural member 75 of this embodiment is designed for use with several engine arrangements, thus the passage 84 is provided with a pair of spaced apart openings 86,88 at the oil pan side 80.

An alternate embodiment of a structural member 75 of the present invention is disclosed in FIG. 4. It is noted that the same reference numerals of the first embodiment are used to designate similarly constructed counterpart elements of this embodiment. In this embodiment, however, the structural member 75 of the sound damping or rigidifying means 70 is constructed from a piece of rolled steel stock. The member 75 has a plurality of equally spaced longitudinally positioned openings 78 therethrough. The fluid passage 84 is provided through the member 75 and is in alignment with the fluid passage 54 in the cylinder block 12. The fluid passage 84 is sealed with the fluid passage 54 and the suction tube 110 is removably attached to the structural member 75 in fluid communication between the lubrication retaining bowl portion 64 of the pan 60 and the fluid passage 54 in the block 12.

Figure 2:
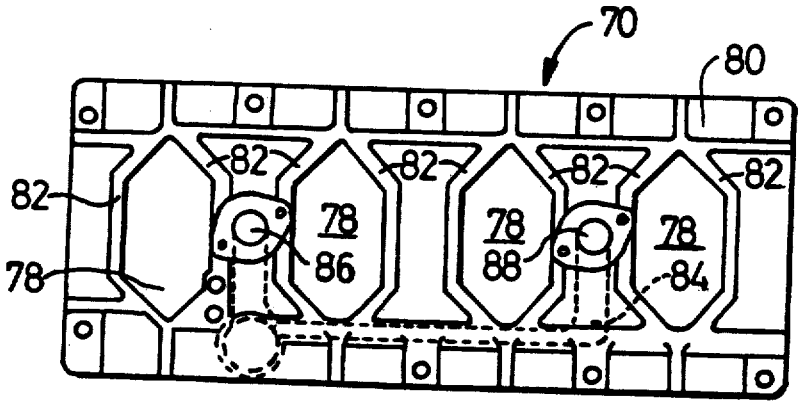
FIG. 2 is a bottom view of a sound damping member of FIG. 1.

As another alternative, the structural member 75 can be a fabrication and include the same structural configuration as shown in FIGS. 2 or 4.

The horizontal relationship of the inner mounting surfaces 48 and the outer mounting surfaces 38 as defined earlier can be above or below one or the other. For example, the outer mounting surfaces 38 could be in a horizontal plane below the inner mounting surfaces 48 or vice versa. Furthermore, the inner mounting surfaces 48 can be a part of either the struts 40 or the pair of sidewalls 30,32 or both the sidewalls and struts 40,30,32. For example, the inner mounting surfaces 48 could be an intermittently spaced surface on individual struts 40 above or below the outer mounting surface 38 on the sidewalls 30,32.

As an alternative, the suction tube 110 could be designed to provide a sump at the opposite end of the engine. The oil pan 60 would also require reversal. Another design option would be to incorporate a center sump, not shown, which would require a change to the structure plate 75 to provide attachment of the suction tube to the center and be in fluid communication with fluid passage 54. The tube 110 would be mounted in the center of the member 75 rather than near on end.

Industrial Applicability

Figure 3:
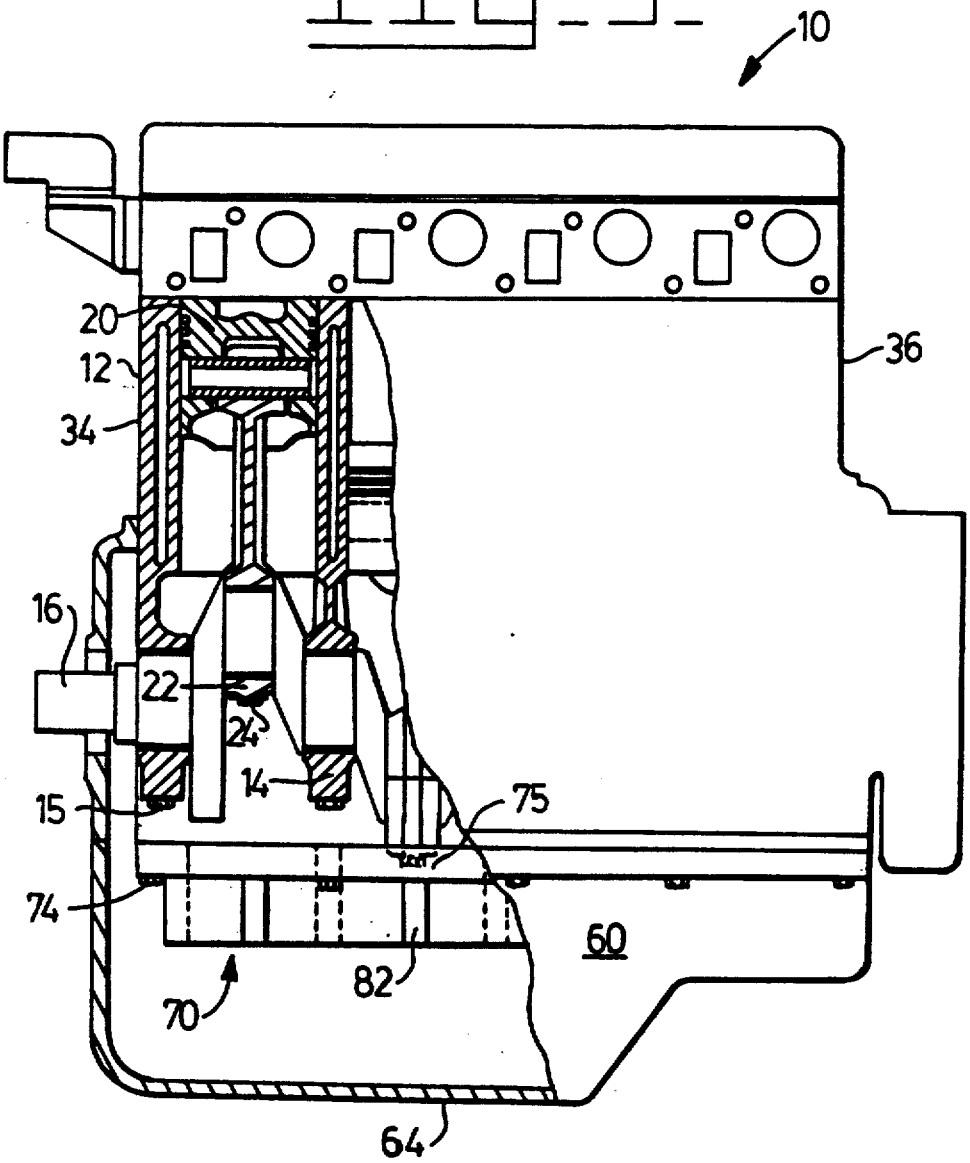
FIG. 3 is a side view of an engine embodying the present invention with portions shown in section for illustration convenience.

The structural member 75 is used to add stiffness to the bottom or lower edge 39 of the cylinder block 12 by interconnecting or tying the pair of sidewalls 30,32 together. As shown in FIG. 3, structural member 75 is used with a four cylinder engine block. The engine is assembled in a conventional way. After assembling the crankshaft 16 and the piston and connecting rod assemblies 20 in the block 12, the member 75 is positioned with the inner mounting side 72 in frictional contact with inner mounting surface 48 of the pair of sidewalls 30,32 and the fluid passage 84 in fluid communication with the fluid passage 54 in the block. The plurality of bolts 74 is used to attach the structural member 70 to the inner mounting surfaces 48 of the struts 40. The clamping force of the bolts 74 and the frictional contact of the inner mounting side 72 and the inner mounting surface 48 forms a rigid structural arrangement reducing vibrations and resultant noise created therefrom. Thus, the block 12 with its pair of sidewalls 30,32 no longer acts as a bell, because of the addition of member 75 which greatly increases the rigidity of the structure. The plurality of openings 78 reduce weight and provide an opening through which the crankshaft 16 and connecting rod caps 14 can rotate during engine 10 operation. The openings 78 allow the structural member 75 to be positioned nearer to the crankshaft 16 without interference therebetween. If the openings 78 did not exist, the length of the sidewalls 30,32 would need to be extended to prevent interference between the member 75 during operational rotation of the crankshaft 16 and connecting rod caps 14. The tube 110 is aligned in sealing engagement with one of the openings 86,88 and the fluid passage 84 in the member 75 and provides fluid communication between an engine oil pump not shown and the lubricating oil in the oil pan 60. The fluid passage 84 is sealingly closed to complete fluid communication between the lubrication oil and the oil pump. After completing the internal assembly of the engine components, the oil pan 60 and gasket 68 are positioned in sealing relationship with the outer mounting surface 38 of the block 12 in a conventional manner.

Thus, the primary advantages of the sound damping and rigidifying means 70 is its ability to reduce noise emanated from the engine by tying the sidewalls 30,32 together and avoid the need to increase the thickness of the sidewalls 30,32 and consequently the weight of the engine 10. The number 75 bridges the space between the struts 40 thus preventing the thin sidewalls 30,32 from vibrating. The bolts 74 force the inner mounting side 72 and the inner mounting surface 48 together in frictional engagement forming a rigid structure. The serviceability of the engine components, main bearing caps 14, crankshaft 16, and piston and connecting rod assembly 20 remain unaffected by the addition of the member 75 since it is free of connection with the main bearing caps. The member 75 is readily adaptable to conventional engine designs by a simple modification of the lower edge or bottom portion of the cylinder block 12. The weight of the member 75 has been held to a minimum without affecting the structural integrity thereof by using an aluminum casting with reinforcing ribs 82 and openings 76. Furthermore, the addition of fluid passage 84 simplifies the lubrication arrangement of the engine by allowing the suction tube 110 to be easily located at various positions within the oil pan 60.

Other aspects, objects and advantages of this invention can be obtained from a study of the drawings, the disclosure and the appended claims.

We claim:

1. A cylinder block having a pair of elongate, spaced apart sidewalls each defining an outer mounting surface along a lower edge thereof, crankshaft mounting means integral with the block in elevationally upwardly spaced relation to the outer mounting surface and including removable bearing caps the sidewalls further defining inner mounting surfaces elevationally spaced below the bearing caps;

a crankshaft rotatably mounted in the crankshaft mounting means and retained therein by the bearing caps;

an oil pan sealingly and removably connected to the outer mounting surfaces of the sidewalls; and rigidifying means removably connected to the inner mounting surface, said rigidifying means structurally interconnecting the pair of sidewalls, *said sidewalls having an inner mounting side being in frictional engagement with substantially the entire length of the inner mounting surface* and being free of connection with the bearing caps.

2. The engine of claim 1 wherein said inner mounting surfaces are defined by the struts.

3. The engine of claim 1 wherein said inner mounting surfaces are defined by the pair of sidewalls.

4. The engine of claim 1 wherein said rigidifying means further includes a fluid passage therein.

5. The engine of claim 4 wherein said fluid passage exits an oil pan side and an inner mounting surface side of the rigidifying means.

6. The engine of claim 5 wherein the fluid passage exiting the oil pan side is in fluid communication with the engine lubricant.

7. The engine of claim 1 wherein said rigidifying means includes a plurality of openings therethrough.

8. The engine of claim 1 wherein said rigidifying means includes a plurality of strengthening ribs extending therefrom.

9. The engine of claim 1 wherein said rigidifying means is a plate.

10. The engine of claim 9 wherein said rigidifying means includes a plurality of openings therethrough.

11. The engine of claim 9 wherein said rigidifying means further includes a fluid passage therein.

12. The engine of claim 11 wherein said fluid passage exits an oil pan side and an inner mounting side of the rigidifying means.

13. The engine of claim 12 wherein said fluid passage is in fluid communication with the engine lubricant.

*14. A cylinder block having a pair of elongate, spaced apart sidewalls each defining an outer mounting surface along a lower edge thereof, crankshaft mounting means integral with the block in elevationally upwardly spaced relation to the outer mounting surface and including removable bearing caps, the sidewalls further defining inner mounting surfaces elevationally spaced below the bearing caps;*

*a crankshaft rotatably mounted in the crankshaft mounting means and retained therein by the bearing caps;*

*an oil pan sealingly and removably connected to the outer mounting surfaces of the sidewalls; and*

*rigidifying means removably connected to the inner mounting surface, said rigidifying means structurally interconnecting the pair of sidewalls and being free of connection with the bearing caps, and said rigidifying means further includes a fluid passage therein.*

*15. The engine of claim 14 wherein said fluid passage exits an oil pan side and an inner mounting surface side of the rigidifying means.*

*16. The engine of claim 15 wherein the fluid passage exiting the oil pan side is in fluid communication with the engine lubricant.*

*17. The engine of claim 14 wherein said rigidifying means includes a plurality of openings therethrough.*

*18. The engine of claim 14 wherein said rigidifying means includes a plurality of strengthening ribs extending therefrom.*

*19. The engine of claim 14 wherein said rigidifying means is a plate.*

*20. The engine of claim 19 wherein said rigidifying means includes a plurality of openings therethrough.*

* * * * *